United States Patent
Taheri et al.

(10) Patent No.: US 6,266,359 B1
(45) Date of Patent: Jul. 24, 2001

(54) SPLICING ASYMMETRIC REFLECTIVE ARRAY FOR COMBINING HIGH POWER LASER BEAMS

(75) Inventors: Bahman Taheri, Hudson; Peter Palffy-Muhoray, Kent, both of OH (US)

(73) Assignee: AlphaMicron, Inc., Kent, OH (US)

( * ) Notice: Subject to any disclaimer, the term of this patent is extended or adjusted under 35 U.S.C. 154(b) by 0 days.

(21) Appl. No.: 09/389,104

(22) Filed: Sep. 2, 1999

(51) Int. Cl.[7] .................................................. H01S 3/08
(52) U.S. Cl. ..................... 372/108; 372/107; 372/108; 359/618
(58) Field of Search .................... 372/99, 107, 108; 359/618, 629, 636, 857

(56) References Cited

U.S. PATENT DOCUMENTS

| | | | |
|---|---|---|---|
| 4,722,591 | 2/1988 | Haffner | 350/174 |
| 4,973,989 | 11/1990 | Yamamoto | 346/108 |
| 5,444,213 | 8/1995 | Honda et al. | 219/121.76 |
| 5,715,270 | 2/1998 | Zediker et al. | 372/75 |
| 5,825,551 | 10/1998 | Clarkson et al. | 359/629 |
| 5,887,096 | 3/1999 | Du et al. | 385/39 |
| 6,038,054 | 3/2000 | Sakai et al. | 359/253 |
| 6,097,540 * | 8/2000 | Neuberger et al. | 359/618 |
| 6,101,037 * | 8/2000 | Park et al. | 359/618 |
| 6,160,664 * | 12/2000 | Du et al. | 359/628 |

FOREIGN PATENT DOCUMENTS

| | | |
|---|---|---|
| 4438368 A1 | 5/1996 | (DE) . |
| 10268131 | 10/1998 | (JP) . |

\* cited by examiner

*Primary Examiner*—Teresa M. Arroyo
*Assistant Examiner*—Cornelius H. Jackson
(74) *Attorney, Agent, or Firm*—Renner, Kenner, Greive, Bobak, Taylor & Weber

(57) ABSTRACT

A splicing asymmetric reflective array (10) for combining at least two input beams (12, 14) into a combined output (16). The arrays include a plurality of substantially reflecting, adjacently positioned layers (20). Each layer (20) has substantially the same width (24) and substantially the same thickness (22) while having a different height dimension (26). A collective entry portion (40) is formed by the adjacent layers' width and thickness dimensions, wherein at least two input beams are directed into and received therein. A collective exit portion (42) is formed by the adjacent layers' height dimensions, wherein the height dimensions are monotonically increasing. A cascade array (60) incorporating the array 10 and reduced size arrays (64, 66, 68, and 70) may be used to combine more than two input beams into one. A three-dimensional array (80), which alters the slope of each layer's height dimension, can be used to combine four input beams (82) into one output beam (84).

22 Claims, 3 Drawing Sheets

SPLICING ASYMMETRIC REFLECTIVE ARRAY FOR COMBINING HIGH POWER LASER BEAMS

TECHNICAL FIELD

The present invention generally relates to an optical element. More specifically, the present invention relates to a device that combines several light beams into a single beam. In particular, the present invention relates to a high power laser beam combiner that receives multiple laser beams and combines them into one beam with minimal loss.

BACKGROUND ART

Very high power (kW) lasers are used in a wide variety of applications. Presently, the maximum achievable powers are ~300 W average. However, the lasers used are operated in a pulsed mode to avoid overheating and related problems; hence are only quasi-Continuous Wave. The power limitation is due to inherent difficulties in producing high gain media, including heat dissipation from the active rod, damage threshold of the elements, durability, power consumption, and cost. Due to the nonlinear nature of lasers, these issues are far less significant in low power lasers. An ideal solution for very high power lasers is to combine outputs of several lasers with lower power. This beam combining could be done intra-cavity or externally depending on the application. Combining broad band, polarization independent light from several incoherent light sources are of special interest for projection displays. This would allow for brighter output from several smaller light sources. In addition, by using polarizers and wave-plates followed by recombination, an unpolarized beam can be turned into a polarized beam, effectively without loss.

There have been many attempts to combine laser beams, using both linear and nonlinear optics, with little or no success. The methods used include (i) focusing two beams into a single fiber and (ii) use of photorefractive beam coupling. The former results in significant loss and is not suitable for high power lasers due to damage to the fiber. The latter requires both beams to be coherent with respect to each other; therefore, they must originate from the same laser. People familiar with the art know that the output beams from two lasers are not coherent with respect to one another and therefore, cannot be combined in a conventional photorefractive geometry. Both methods are wavelength dependent and cannot be used with a broadband source. To date, there are no known effective beam combiners in any laser system.

Conversion of unpolarized into polarized light sources has been the subject of several investigations. These methods involve the use of reflecting polarizers followed by some conversion mechanism. None of these systems, however, have proved useful due to their inefficient performance. Furthermore, these systems cannot be used to combine light from several different light sources. There is considerable interest, in combining polarized or unpolarized light depending on the required performance.

The primary obstacle to certain strategies of beam combining are physical constraints originating from energy conservation.

Origin of the Problem

The fundamental difficulty in combining beams can be illustrated by considering the special case of combining two plane polarized, monochromatic coherent beams of the form $$\vec{E}_1 = \hat{e}_1 E_0 f_1(x,y) \cos(\vec{k}_1 \cdot \vec{r} - \omega t) \tag{1}$$

$$\vec{E}_2 = \hat{e}_2 E_0 f_2(x,y) \cos(\vec{k}_2 \cdot \vec{r} - \omega t + \phi) \tag{2}$$

where the E is the electric field, k is the wavevector, $\omega$ is the angular frequency and $\phi$ is the phase difference between the two beams. The polarization direction is given by $\hat{e}$; the transverse beam profiles are given by $f_1(x,y)$ and $f_2(x,y)$. The photon flux (the number of photons crossing a surface per unit time) for each beam in a material with dielectric constant $\in$ is proportional to the energy flux, J, which to a good approximation is given by:

$$J_1 = \frac{c\varepsilon}{2}\int dS\langle|\vec{E}_1|^2\rangle = \frac{c\varepsilon E_0^2}{2}\int f_1^2(x,y)dA \tag{3}$$

$$J_2 = \frac{c\varepsilon}{2}\int dS\langle|\vec{E}_2|^2\rangle = \frac{c\varepsilon E_0^2}{2}\int f_2^2(x,y)dA \tag{4}$$

where dA is an element of area and c is the speed of light. The total flux for both beams is $$J = J_1 + J_2 = \frac{c\varepsilon E_0^2}{2}\int [f_1^2(x,y) + f_2^2(x,y)]dA \tag{5}$$

If the beams were combined, the flux for the two collinearly propagating beams is:

$$J = \frac{c\varepsilon}{2}\int dS\langle|\vec{E}_1 + \vec{E}_2|^2\rangle \tag{6}$$

$$= \frac{c\varepsilon E_0^2}{2}\int [f_1^2(x,y) + f_2^2(x,y)]dA +$$

$$\frac{c\varepsilon E_0^2}{2}(\hat{e}_1 \cdot \hat{e}_2)\int \cos(\Delta\vec{k}\cdot\vec{r} + \phi)f_1(x,y)f_2(x,y)dA$$

In the steady state, in a passive nonabsorbing device, the total flux is conserved. Comparing Eqs. 5 and 6, energy conservation requires $$(\hat{e}_1 \cdot \hat{e}_2)\int \cos(\Delta\vec{k}\cdot\vec{r}+\phi)f_1(x,y)f_2(x,y)dA=0 \tag{7}$$

Since we are interested in combining collinearly propagating, monochromatic light (i.e., $\Delta\vec{k}=0$), the condition reduces to:

$$\cos(\phi)(\hat{e}_1 \cdot \hat{e}_2)\int f_1(x,y)f_2(x,y)dA=0 \tag{8}$$

Any successful beam combiner must satisfy this condition. In particular, the optical element must be constructed so that either, (i) the relative phase between the two input beams is exactly 90°, or (ii) they have orthogonal polarization, or (iii) the overlap integral vanishes.

The above requirement is for monochromatic sources, and holds when beams from a number of identical sources are combined. It does not apply only if the beams to be combined have different wavelengths.

Beams With 90 Degrees Phase Difference ($\cos(\phi)=0$)

If $\phi=90°$, $\cos\phi=0$ and Eq. 7 is satisfied. This method has been demonstrated in photorefractive beam coupling experiments. In these experiments, two coherent beams are crossed in a photorefractive medium. The interference pattern set up by the two beams generates a grating of charge carriers. Due to the internal field, the carriers move to the dark regions of the interference pattern and set up a space charge field with the vacancies that are left behind. This space charge field alters the refractive index through the linear electro-optic effect. The index change has the periodicity of the initial interference pattern but is offset by a phase difference of 90 degrees. Energy can therefore be transferred from one beam to another without violating energy conservation. Moreover, there is evidence of energy transfer from one beam to another in certain materials. However, the beams used must originate from the same laser and be coherent for the interference pattern to be realized. Photorefractive materials therefore cannot be used to combine beams from different laser sources since these are not coherent with respect to one another. Furthermore, their efficiency is wavelength and temperature dependent, and they typically cannot operate much beyond near IR where most common high power lasers operate.

Alternatively, one can combine two beams via a beam splitter, such as a half-silvered mirror oriented at 45° to the direction of propagation, as in the output of a Mach-Zehnder interferometer. The beams transmitted and reflected by the beam splitter will be out of phase by 90 degrees. Consequently, two beams can be combined so that they will propagate in a given direction if (and only if) the two beams are coherent. As in the case of the photorefractive effect, this method can also not be used to combine beams from two different lasers.

Use of Orthogonal Polarizations $(\hat{e}_1 \cdot \hat{e}_2)=0$

The vanishing of $\hat{e}_1 \cdot \hat{e}_2$ allows the combination of two orthogonally polarized beams. A polarizing beam splitter is an element which utilizes total internal reflection within a birefringent material to separate the components with different polarizations into two orthogonally propagating beams. Using this, one can clearly bring two beams of orthogonal polarizations together and combine them into a single collinear beam. However, this can only be done once. In other words, this technique can only be applied for two beams of orthogonal polarizations. The combined beam will have a random polarization if the two beams are not coherent. Consequently, no additional beams from other lasers can be added. It should also be noted that even for combining two beams, it is necessary for the output from the lasers to be polarized.

Forcing the Overlap Integral to Vanish

To combine beams from a number of lasers, therefore, the only scenario allowed by energy conservation is forcing the overlap integral to vanish. This method allows the combination of incoherent beams regardless of polarization, and can, therefore, be extended to several laser beams. In this case, it is required that the integral $$\int f_1(x,y) f_2(x,y) dx dy = 0 \qquad (9)$$

This is achieved if the beams do not overlap. Simply arranging beams "side-by-side" is an example of this case. However, this will severely alter the profile of the combined beam and is therefore not useful in practice.

Therefore, there is a need for a low cost optical element and method for use which can combine several beams with little alteration of their characteristics. The element should be constructed using either linear or nonlinear optical materials to allow for usage ranging from projection systems to optical computing. Furthermore, there is a need for a system that can be used to combine both coherent and incoherent beams and is wavelength and polarization independent over a large spectral range. Due to its geometry, the needed element will need to operate below the damage threshold if the input beams used are from high power lasers. There is also a need for a stand-alone system to combine beams external to a laser cavity or which can be placed within the cavity for coherent combining. There is also a need for an element which can be implemented in conjunction with other methods, such as those utilizing the photorefractive effect, to allow for high efficiency in those techniques.

DISCLOSURE OF INVENTION

In light of the foregoing, it is a first aspect of the present invention to provide a splicing asymmetric reflective array for combining high power laser beams.

It is an object of the present invention to provide a device capable of combining light from several coherent or incoherent sources.

It is another object of the present invention, as set forth above, to provide a device capable of combining light beams from monochromatic or broad band sources.

It is yet another object of the present invention, as set forth above, to provide a device capable of combining several beams of polarized or unpolarized light.

It is still another object of the present invention, as set forth above, to provide a device capable of minimal alteration in the output beam profile.

It is a further object of the present invention, as set forth above, to provide a device capable of being used in conjunction with other technologies such as nonlinear optics or lasers.

It is yet a further object of the present invention, as set forth above, to provide a device capable of being placed within a laser cavity.

It is still a further object of the present invention, as set forth above, to provide a device capable of being implemented using a variety of materials and reflectors.

It is an additional object of the present invention, as set forth above, to provide a plurality of reflecting layers or mirrors with perfect or less than perfect reflection properties, adjacently positioned one another with substantially the same width and length, but a different height for each layer such that the layers are placed in a monotonically increasing order.

It is yet an additional object of the present invention, as set forth above, to configure the plurality of reflecting layers to form a collective entry portion which receives at least two input beams and wherein the layers form a collective exit portion formed by their various different heights.

It is still an additional object of the present invention, as set forth above, to provide at least two inputs into the collective entry portion at an input angle, wherein the output beam from the collective exit portion forms an output angle with respect to the collective entry portion equivalent to 90° less the input angle of the input beams.

It is another object of the present invention, as set forth above, to provide an array which is cascaded with smaller arrays to combine additional input beams so as to ultimately result in one output beam.

It is another object of the present invention, as set forth above, to provide a three-dimensional array wherein the height dimension of each layer has a constant slope, and wherein the array receives at least four input beams so as to generate one output beam.

It is still another object of the present invention, as set forth above, to position at least one condenser lens near the collective output portion for the purpose of resizing the output beam.

The foregoing and other objects of the present invention, which shall become apparent as the detailed description proceeds, are achieved by a splicing asymmetric reflective array for combining at least two input beams into a combined output, comprising a plurality of at least partially reflecting, adjacently positioned, layers, each layer having substantially the same width and substantially the same thickness, each layer having a different height dimension, a collective entry portion formed by the adjacent layers' width and thickness dimensions, wherein the at least two input beams are directed into the collective entry portion, and a collective exit portion formed by the adjacent layers' height dimensions, wherein the height dimensions are monotonically increasing, and wherein the at least two input beams are combined by the layers to generate the combined output which emanates from the collective exit portion.

Other aspects of the present invention are attained by a cascaded splicing asymmetric reflective array for combining a plurality of input beams into a combined output beam comprising a first plurality of at least partially reflecting, adjacently positioned layers, each layer in the first plurality having substantially the same width and substantially the same thickness, each layer in the first plurality having a different height dimension, the first plurality having a collective entry portion for receiving the plurality of input beams, and a collective exit portion for generating the combined output, at least a second and a third plurality of at least partially reflecting, adjacently positioned layers, each layer in the second and the third plurality having substantially the same width and substantially the same thickness, each layer in the second plurality having a different height dimension and each layer in the third plurality having a different height dimension, the second plurality of layers having a collective entry portion for receiving a second set of input beams and a collective exit portion for generating one of the input beams for the first plurality of layers, and the third plurality of layers having a collective entry portion for receiving a third set of input beams and a collective exit portion for generating one of the other input beams for the first plurality of layers.

Still another aspect of the present invention is attained by a splicing asymmetric reflective array for combining input beams into an output beam, comprising a major array which includes a plurality of at least partially reflecting, adjacently positioned layers, a collective entry portion formed by a width and a thickness dimension of the layers for receiving the input beams which are intermixed by the layers, and a collective exit portion formed by a height dimension of the layers for directing the intermixed input beams as the output beam.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
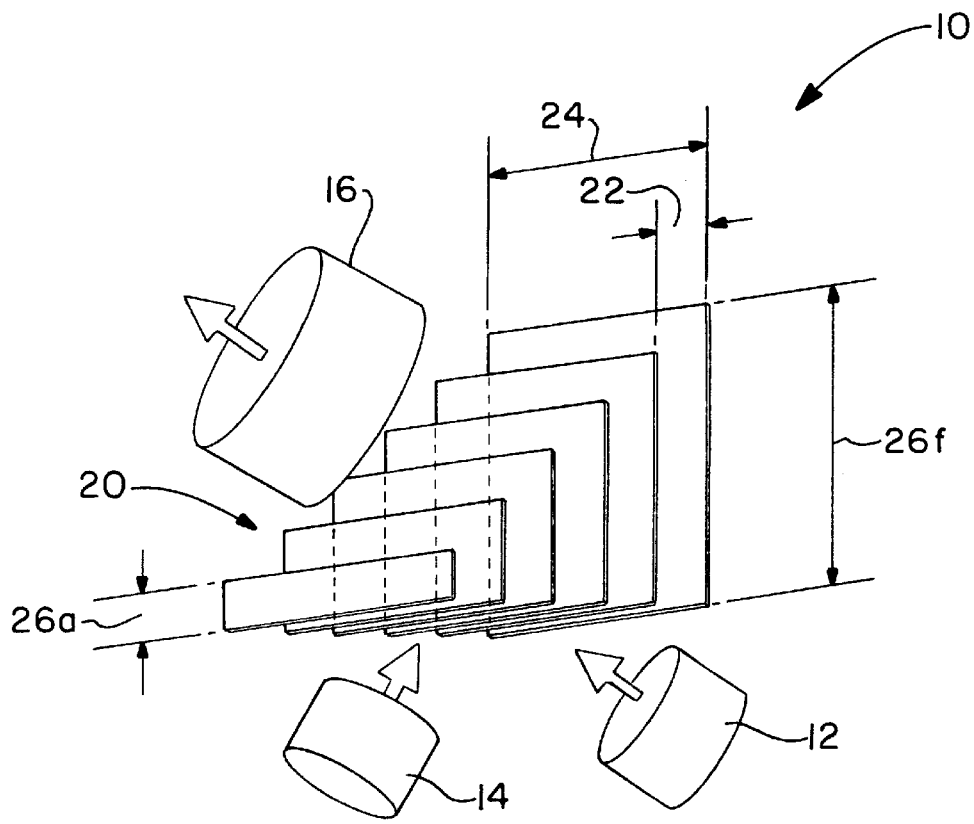
FIG. 1 is a perspective schematic illustration of a splicing asymmetric reflective array according to the present invention.
Figure 2:
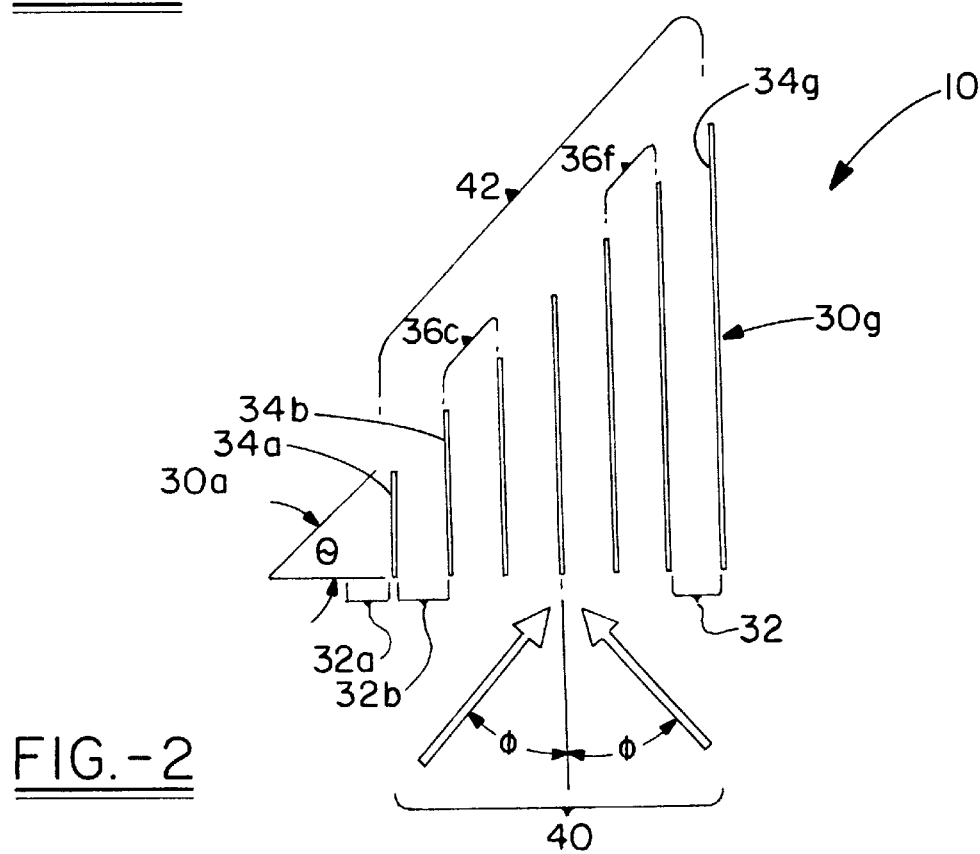
FIG. 2 is a schematic elevational view of the array.
Figure 3:
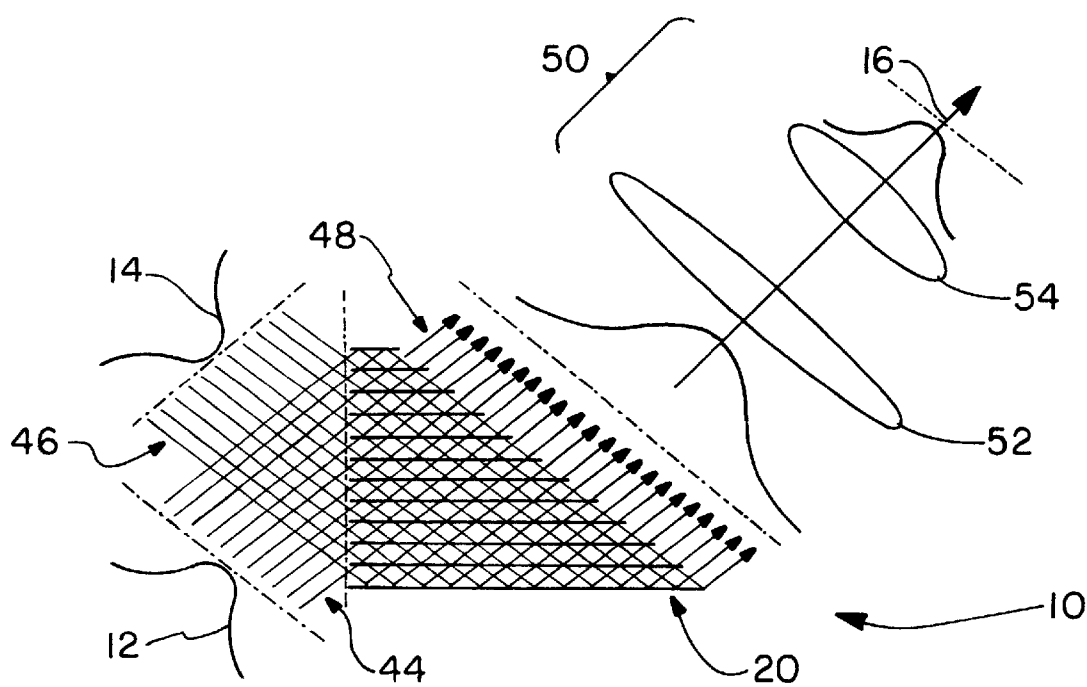
FIG. 3 is a schematic representation of input beams received and combined by the array to generate an output beam.

Referring now to the drawings and more particularly to FIGS. 1–3, it can be seen that a splicing asymmetric reflective array according to the present invention is designated generally by the numeral 10. As shown in FIG. 1, the array 10 receives an input beam 12 and an input beam 14 in a two-dimensional configuration. The array 10 is essentially a dielectric medium which combines the beams 12 and 14 to generate a combined output beam 16. In its simplest form, the array 10 is a waveguide array composed of parallel reflecting layers with a different linear dimension in a dielectric medium. It has been found that by cutting the reflecting array at specific planes, both input beams co-propagate in the desired direction with little or no alteration in their characteristics.

The array 10 includes a plurality of substantially parallel reflecting layers or mirrors collectively designated by the numeral 20 and wherein each layer or mirror is individually designated by the numeral 30. Each layer 30 may be a perfectly reflecting mirror or, in the alternative, a partially reflecting mirror to allow for better mixing of the input beams 12 and 14. The mirrors may also be made to provide linear or nonlinear interaction. In other words, the reflective array 10 represents a grating made from two lasers in a nonlinear optical material such as a photorefractive crystal to enhance the photorefractive effect. The mirrors may also be partially silvered for greater intermixing between the beams. Partial silvering can be variable for the different layers 30. As will become apparent as the detailed description proceeds, the proper choice of silvering for each layer 20 can be used to tailor the profile of the output beam 16.

Each layer 30 has a predetermined set thickness dimension 22 and a predetermined set width dimension 24. Although only six layers are shown in FIG. 1, it will be appreciated by those skilled in the art that any number of layers could be employed in the array 10. Each height dimension, as seen in FIG. 2, is determined by the angle θ which is equal to about 90° less the input angle (φ) of the input beams 12 and 14. In order to properly mix each input beam 12 and 14, it is preferred that they are provided with the same input angle φ in the embodiments shown in FIGS. 1–3.

In this case, the reflecting surfaces act as the angular bisector for the propagation directions of the two incident beams. In its simplest form, all specified angles are 45°. It should be noted that the specified angles are not independent of each other. For combining two beams, the condition, θ=90–φ, should be satisfied. The array 10 causes the overlap integral to vanish while intermixing the two beams. The array 10 is a two-dimensional configuration where the two incident beams are separated by 90°, thus making both θ and φ be 45°.

As best seen in FIG. 2, each layer 30 has a letter suffix which designates its height in relation to the other layers. For example, the shortest layer is identified by the characters 30a and the largest dimension layer is designated by the characters 30g. Each layer 30 has a different height dimension and monotonically increases from the shortest layer 30a to the largest layer 30f. Each layer 30 has an entry portion 32 with a corresponding alphabetic suffix designation. The entry portion 32 allows entry of light or the laser beam into the array 10. Each layer 30 also provides a reflection portion 34 with corresponding alphabetic suffix designation. The reflection portion 34 reflects the input beams 12 and 14. Once the input beams are reflected by the reflection portion 34, the beams impinge on a backside of the adjacent layer's reflection portion. Each input beam is then reflected back and forth between layers until it reaches the other end of the layer 30. When each layer is assembled adjacent one another, a collective entry portion 40 is formed for where the input beams 12 and 14 are received. Likewise, a collective exit portion 42 is formed by the variable height dimensions of each layer 30.

As best seen in FIG. 3, the input beams 14 and 16 form corresponding input component waves 44 and 46. These component waves have the properties of $J_1$, $F_1$ and $J_2$, $F_2$, respectively, wherein J designates the flux (photons/sec) and F designates the fluence (photons/area) of the input beams. The component waves are segmented or split by virtue of their angle of incidence into the collective entry portion 40. Accordingly, each input beam is broken up into component portions which reflect between adjacent reflecting layers. The same phenomenon occurs to the other input beam and the input beams are effectively directed into one direction defined by the collective exit portion 42. Accordingly, the output beam 16 is a splicing of the component waves 44 and 46. This results in a combined flux value of $J_1+J_2$ and a combined fluence value of $(F_1+F_2)/2$. If desired, a pair of condenser lenses 52 and 54 may be employed to reduce the combined beam waist to that of the original beams.

FIG. 3 shows the trajectories of two beams incident on the array 10. In this case, perfect reflectors are assumed to demonstrate the proposed concept. It can be seen that the unique configuration of the optical element alters the propagation direction of only one beam while maintaining a profile similar to the input beams. The output beam can then be re-sized using appropriate condensing lenses. Since a lens only alters the flux density of a beam (energy/area) and not the flux, lenses can be used to re-size a beam without violating flux conservation.

Figure 4:
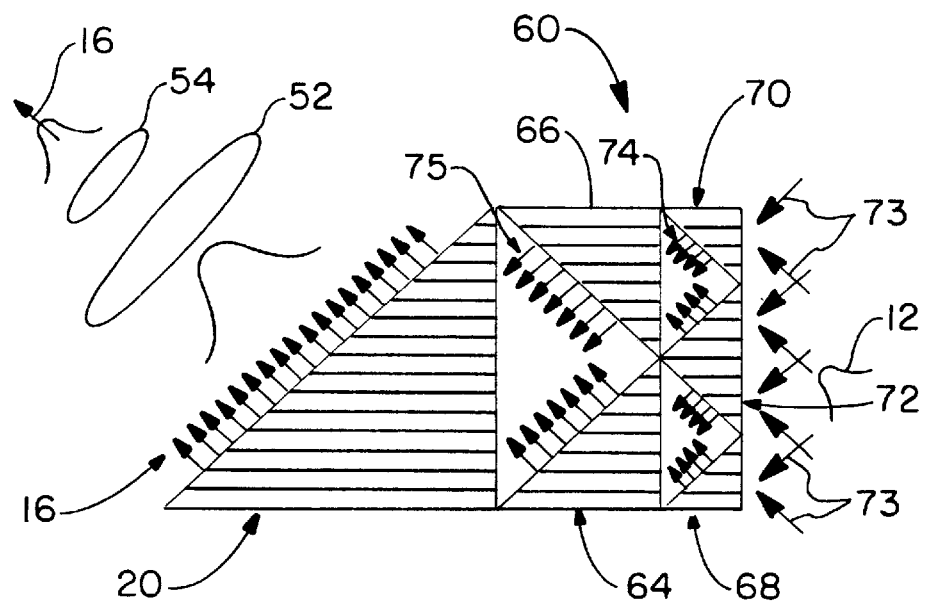
FIG. 4 is a schematic representation of a cascaded splicing asymmetric reflective array.

Referring now to FIG. 4, it can be seen that the plurality of reflecting layers 20 may be placed adjacent additional splicing asymmetric reflective arrays to obtain a cascading geometry. In particular, a cascade splicing asymmetric reflective array, according to the present invention is designated generally by the numeral 60. A first array is configured in much the same manner as the plurality of layers 20 and is placed adjacent to a pair of half arrays 64 and 66. These half arrays 64 and 66 are substantially the same as the array 20, but half the size. A further cascading effect can be provided by positioning a plurality of quarter splicing asymmetric arrays 68, 70, and a back-to-back splicing asymmetric reflective array 72 adjacent the half arrays 64 and 66. The array 60 allows for up to eight input beams to be combined into one output beam. The configuration of the half arrays 64 and 66 are such that the longest length of the reflecting layers are placed adjacent the longest and the shortest reflecting layer of the larger array 20 to which it is coupled. As such, the shortest lengths of the reflecting half arrays 64 and 66 are placed adjacent one another. A similar, yet quarter-sized array is then placed adjacent each half array 64 and 66. In other words, the quarter-arrays 68 and 70 are placed such that their longest reflecting layer is placed adjacent the longest reflecting layer of the half array. For the back-to-back quarter-array 72, their longest layers are placed adjacent the shortest layers of the half-arrays 64 and 66.

In operation, the cascade array 60 receives eight input beams 73, wherein two of the beams 73 are received by each of the quarter-arrays 68, 70 and 72, respectively. Each of these quarter-arrays then generate a single input beam 74. Next, each half-array 64 and 66 receives two of the input beams 74 generated by the adjacent quarter-arrays to generate two further input beams 75 which are received by the largest array 10 to generate the output beam 16. It will be appreciated that further smaller arrays could be coupled to the cascade array 60 to combine any number of beams into one output beam. Alternatively, the cascade array 60 could be employed to effectively split one beam into a plurality of output beams by reversing the flow of laser light therethrough.

Figure 5:
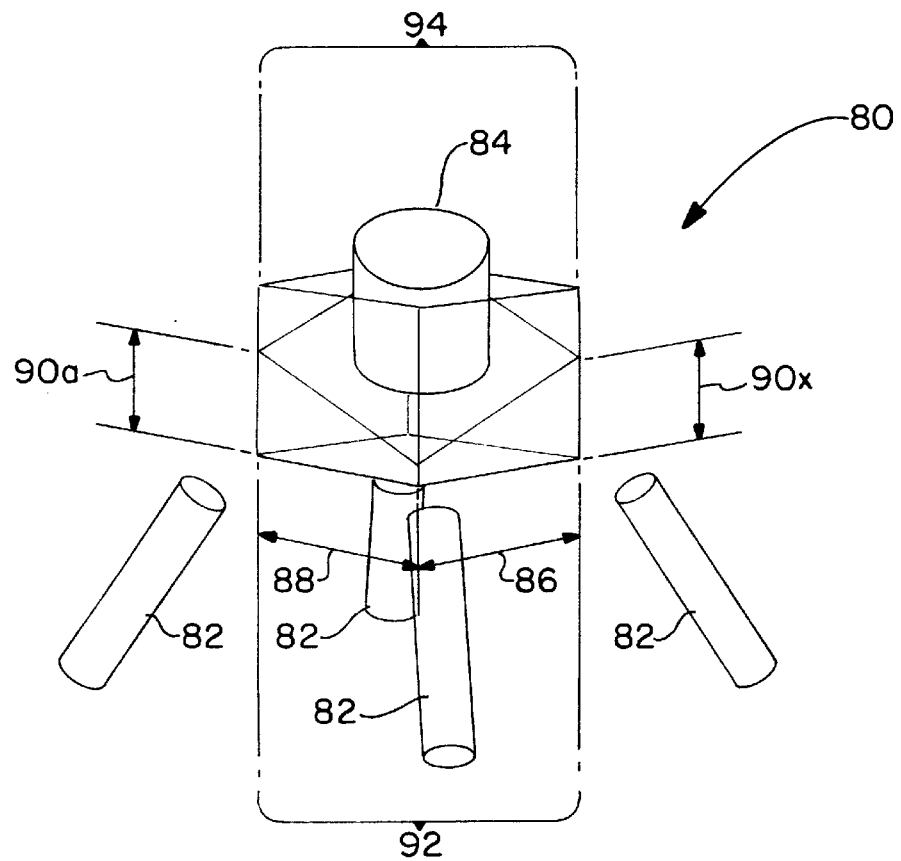
FIG. 5 is a schematic representation of a three-dimensional splicing asymmetric reflective array which combines four input beams into one output beam.

Another variation of the splicing asymmetric reflective array is shown in FIG. 5 and is designated generally by the numeral 80. This is a three-dimensional splicing asymmetric reflective array which allows for receiving four input beams 82 to generate a single output beam 84. This configuration is similar to the two-dimensional array which employs a plurality of reflecting layers each of which has a set thickness 86 and a set width dimension 88. Each reflecting layer has a variable height dimension 90 with a corresponding alphabetic suffix designation for each layer. For the array 80, the height dimension of each layer or mirror is provided with a constant slope from the shortest to the largest dimension height provided. Accordingly, each component of the input beams 82 are intermixed at the input angles as evidenced by a collective entry portion 92 and exits at a collective exit portion 94. The input beams 82 intermix at the appropriate angles of incidence so that they are generated or exit the device in a uniform output beam 84.

Figure 6:
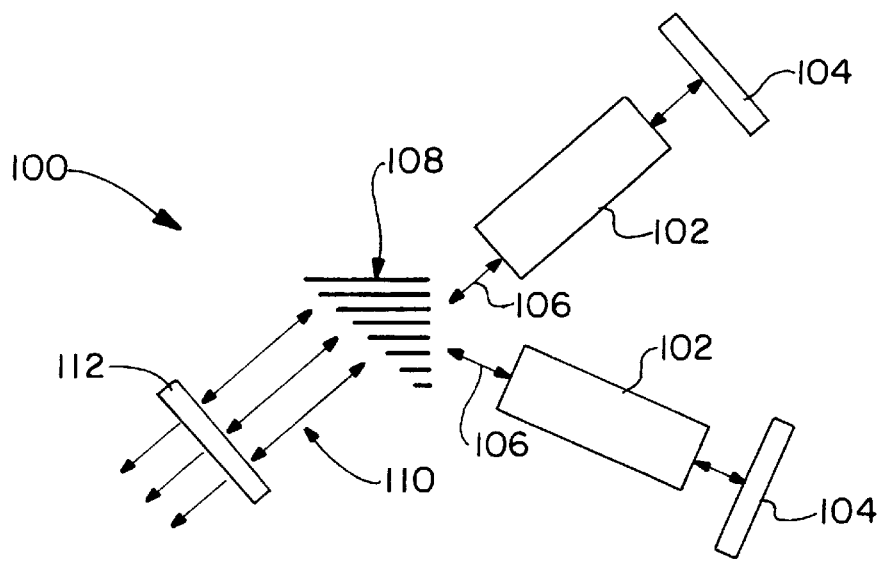
FIG. 6 is a schematic representation of the array incorporated into a laser cavity.

Each of the arrays (10, 60, and 80) discussed herein may be employed in an intercavity system as shown in FIG. 6 and designated generally by the numeral 100. In an actual use, the system 100 includes a pair of laser rods 102 each associated with mirrors 104. The laser rods 102 generate input beams 106 which are received by a splicing asymmetric reflective array 108 which generates output beams 110. These beams 110 are received by a coupler 112 to generate the desired high energy combined laser beam.

The reflection in the arrays discussed herein efficiently combine input beams such as laser beams. Furthermore, the reflecting elements can be perfectly reflecting or partially reflecting to allow for a better mixing of the input beams; or made through linear or nonlinear interaction, wherein the reflecting arrays can represent a grating made from two lasers in a nonlinear optical materials such as a photorefractive crystal which enhances the photorefractive effect. The arrays discussed herein can be placed within a laser cavity to coherently combine two lasers. Each system can then operate below the restrictive power levels of high power lasers.

The arrays discussed herein can be used to satisfy all the requirements needed in a beam combiner. The advantages of such arrays are readily apparent. A simple cascading array geometry can be used to combine several beams. In theory, there is no limitation to the number of beams that can be combined in this fashion. FIG. 4 shows a cascade geometry in a single element that can be used to combine multiple beams.

It is envisioned that the input beams are collimated before the arrays. The output of the arrays retain the collimation characteristics of the input beams. The arrays presented herein effectively splice the input beams. If the input beams have the same profile, intermixing produces an output beam whose profile is approximately a scaled replica of the input beam profile. The output beam can also be re-sized in a conventional manner using a condensing lens pair. Since the arrays are based on reflecting elements, a broadband reflector can be used to allow for a continuous operation from UV to mid IR region. Other regions of the electromagnetic spectrum can be used by appropriate choice of reflecting planes.

Still another advantage of the present arrays is that they do not rely on the polarization of the beams. This is important since the output from most lasers is not, in general, polarized. Still yet another advantage of the arrays is that they do not require coherent beams and, as such, can be used to combine several sources that are incoherent with respect to each other. However, it is expected that the system can be made to allow for coherent combination of lasers. The arrays of the present invention are a simple, passive optical element that can be made using a number of simple materials such as glass or plastic.

The arrays can be cascaded to allow for combination of many input sources. Furthermore, the arrays can be expanded from a two-dimensional configuration to a three-dimensional element which allows for combining four beams in a single element. Since combining occurs within a single element, the arrays are resistant to damage. Use of plastic planes ruggedizes the element and allows its use in hostile environments. The system utilizes a novel method for redirecting one beam with minimal alteration to another. It is clear that this can be used with other systems for enhanced performance. For example, a photorefractive crystal cut in the shape of the present arrays show an enormous enhancement to the conventional beam coupling as known to people familiar with the art.

EXAMPLE

A two-dimensional array, similar to that shown in FIGS. 2 and 3, uses an array of reflecting mirrors. A single 6" square glass with a thickness of 1 mm was uniformly coated with ~1000 A of aluminum. The sheet was then scribed using a diamond cutter in 10 strips. The thickness of the strips was that of the glass (1 mm), their height was 5 cm and their width was monotonically increased from 5 mm to 15 mm. The strips were then glued together.

A Helium Neon laser beam was split into two equal parts using a 1" polarizing beam splitter cube from Newport Corp. The p-polarized beam out of the beam splitter was converted to a s-polarized light via a half wave-plate. The beams were then recombined using the array.

Beam combiners have several applications for high power laser system, Ladar, nonlinear optics and fiber-optic communications as well as broad band source applications such as projection displays and polarization converters. The above characteristics of the arrays can be expanded to include a three-dimensional geometry. The geometry used presented an asymmetry in two dimensions. By use of rectangular waveguides (rather than the parallel plates), it is expected that four beams can be combined simultaneously. This can significantly reduce the number of needed elements.

The arrays can be constructed using partial silvered mirrors for greater intermixing between the beams. The partial silvering may be variable for the different slices. For example, the first and last strips may be perfect reflectors; however, the silvering degree can decrease for the interior elements. Proper choice of silvering can also be used to tailor the output beam profile. The reflecting surfaces can also be composed of index variations as seen in holographic medium. The geometry used for the arrays can be implemented in nonlinear optical crystals. In particular, highly efficient beam coupling can be realized for crystals cut at the angles specified by the present arrays.

If arrays of the present invention are placed within a laser cavity, it should be possible to combine two smaller laser cavities for a larger output. In this way, each cavity can operate below the damage and thermal thresholds while increasing the output power. This can be used to increase the output from a dual head laser. The intensity at any location within the cavity will be below the damage threshold. The output, however, will be coherent and more energetic.

The structure of the arrays presented above can apply to any propagating wave. These can include x-ray, ultraviolet, infrared, microwave, radio waves as well as acoustic and ultrasonic waves. The main features of the design remain fixed. The main feature of the arrays that would be altered would be the choice of the reflecting material.

The possible applications for the arrays presented above may be used in military and civilian systems where low cost and high power is desired. An increase in the luminance is a limiting factor in current projection systems. It is expect that the present arrays could be utilized to increase the source luminance at low cost. High power lasers are required to enhance the signal to noise ratio for fiber-optic communication. Use of the present array would allow the use of multiple diode lasers to produce the required power at the desired wavelengths.

The polarization state of an unpolarized source can be converted using the present arrays. In short, a polarizing beam splitter can be used to isolate the two polarization states.

The beams can then be forced to the same polarization via a wave-plate and then finally recombined. This can enhance the performance of several devices which utilize polarized light for operations such as electro-optic shutters.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of true scope and breadth of the invention, reference should be made to the following claims.

What is claimed is:

1. A splicing asymmetric reflective array for combining at least two input beams into a combined output, comprising:
    a plurality of at least partially reflecting, adjacently positioned, layers, each said layer having substantially the same width and substantially the same thickness, each said layer having a different height dimension;
    a collective entry portion formed by said adjacent layers' width and thickness dimensions, wherein the at least two input beams are directed into said collective entry portion; and
    a collective exit portion formed by said adjacent layers' height dimensions, wherein said height dimensions are monotonically increasing, and wherein the at least two input beams are combined by said layers to generate the combined output which emanates from said collective exit portion.

2. The array according to claim 1, wherein said at least two input beams are input into said collective entry portion at a substantially equivalent input angle.

3. The array according to claim 2, wherein said collective exit portion forms an angle with respect to said collective entry portion substantially equivalent to 90° less said input angle.

4. The array according to claim 1, wherein each said layer has an entry portion and a reflective portion at said thickness, and wherein said reflective portions are positioned adjacent an entry portion of an adjacent layer.

5. The array according to claim 1, wherein each said layer is perfectly reflecting.

6. The array according to claim 1, wherein each said layer is partially reflecting.

7. The array according to claim 1, further including at least two condenser lenses positioned adjacent said collective exit portion.

8. The array according to claim 1, wherein said collective exit portion generates the combined output equivalent to a summed flux value of the input beams.

9. The array according to claim 1, wherein said different height dimension is substantially constant with respect to said width dimension.

10. The array according to claim 1, wherein said different height dimension has a substantially constant slope for each said layer.

11. The array according to claim 1, wherein said collective exit portion is positioned so that said output beam is directed into an adjacent splicing reflective array as an input beam.

12. A cascaded splicing asymmetric reflective array for combining a plurality of input beams into a combined output beam comprising:

a first plurality of at least partially reflecting, adjacently positioned layers, each said layer in said first plurality having substantially the same width and substantially the same thickness, each said layer in said first plurality having a different height dimension, said first plurality having a collective entry portion for receiving the plurality of input beams, and a collective exit portion for generating the combined output;

at least a second and a third plurality of at least partially reflecting, adjacently positioned layers, each said layer in said second and said third plurality having substantially the same width and substantially the same thickness, each said layer in said second plurality having a different height dimension and each said layer in said third plurality having a different height dimension;

said second plurality of layers having a collective entry portion for receiving a second set of input beams and a collective exit portion for generating one of the input beams for said first plurality of layers; and said third plurality of layers having a collective entry portion for receiving a third set of input beams and a collective exit portion for generating one of the other input beams for said first plurality of layers.

13. The array according to claim 12, wherein said second and said third plurality of layers each have a substantially equivalent minimum height layer positioned adjacent one another.

14. The array according to claim 12, wherein said second and said third plurality of layers each have a substantially equivalent maximum height layer positioned opposite one another.

15. A splicing asymmetric reflective array for combining input beams into an output beam, comprising:

a major array which includes a plurality of at least partially reflecting, adjacently positioned layers, a collective entry portion formed by a width and a thickness dimension of said layers for receiving the input beams which are intermixed by said layers; and a collective exit portion formed by a height dimension of said layers for directing the intermixed input beams as the output beam.

16. The array according to claim 15, further comprising:

a pair of half arrays configured substantially the same as said major array except about half the size thereof, such that a collective exit portion of each said half-array generates the input beams.

17. The array according to claim 16, further comprising:

a plurality of quarter arrays configured substantially the same as said major array except about a quarter the size thereof, such that a collective exit portion of each said quarter array generates a quarter array output beam received by said pair of half arrays.

18. The array according to claim 15, further comprising:

a plurality of reduced-size arrays configured substantially the same as said major array, wherein a collective exit portion of each said reduced-size array generates an input beam received by a next larger-size array.

19. The array according to claim 18, wherein the input beams are received into a collective entry portion of a next larger array at a substantially equivalent angle.

20. The array according to claim 15, further comprising:

at least one condenser lens positioned adjacent said collective exit portion.

21. The array according to claim 15, wherein each said layer is perfectly reflecting.

22. The array according to claim 15, wherein some of said layers are perfectly reflecting and the remaining said layers are somewhat less than perfectly reflecting.

* * * * *